United States Patent
Wu et al.

(10) Patent No.: US 11,961,046 B2
(45) Date of Patent: Apr. 16, 2024

(54) AUTOMATIC SELECTION OF REQUEST HANDLER USING TRAINED CLASSIFICATION MODEL

(71) Applicants: MICRO FOCUS LLC, Santa Clara, CA (US); Zhu Jing Wu, Shanghai (CN); Xin-Yu Wang, Shanghai (CN); Jin Wang, Shanghai (CN); Chun-Hua Li, Shanghai (CN); Zhen Cui, Shanghai (CN)

(72) Inventors: Zhu Jing Wu, Shanghai (CN); Xin-Yu Wang, Shanghai (CN); Jin Wang, Shanghai (CN); Chun-Hua Li, Shanghai (CN); Zhen Cui, Shanghai (CN)

(73) Assignee: Micro Focus LLC, Santa Clara, CA (US)

( * ) Notice: Subject to any disclaimer, the term of this patent is extended or adjusted under 35 U.S.C. 154(b) by 735 days.

(21) Appl. No.: 17/054,907

(22) PCT Filed: May 22, 2018

(86) PCT No.: PCT/CN2018/087818
§ 371 (c)(1),
(2) Date: Nov. 12, 2020

(87) PCT Pub. No.: WO2019/222908
PCT Pub. Date: Nov. 28, 2019

(65) Prior Publication Data
US 2021/0224593 A1 Jul. 22, 2021

(51) Int. Cl.
*G06Q 10/107* (2023.01)
*G06F 18/214* (2023.01)
(Continued)

(52) U.S. Cl.
CPC ......... *G06Q 10/107* (2013.01); *G06F 18/214* (2023.01); *G06F 18/24155* (2023.01); *G06N 3/044* (2023.01); *G06N 7/01* (2023.01)

(58) Field of Classification Search
CPC ............... G06Q 10/107; G06F 18/214; G06F 18/24155; G06N 3/044; G06N 7/01
See application file for complete search history.

(56) References Cited

U.S. PATENT DOCUMENTS 9,299,031 B2   3/2016 Jan
9,477,963 B2  10/2016 Kar
(Continued)

FOREIGN PATENT DOCUMENTS

| CN | 106294466 A | 1/2017 |
| CN | 103620587 B | 5/2017 |
| CN | 107516135 A | 12/2017 |

OTHER PUBLICATIONS

BMC Software Inc. Analytics, Machine Learning, and Incident Management; Five Strategies To Move From A Reactive To Proactive Approach; 2016; 13 pages.
(Continued)

*Primary Examiner* — Mia M Thomas
(74) *Attorney, Agent, or Firm* — Sheridan Ross P. C.

(57) ABSTRACT

A computing device includes a processor and a medium storing instructions. The instructions are executable by the processor to: in response to a receipt of an electronic request comprising one or more structured data fields and one or more unstructured data fields, identify a set of previous electronic requests using the one or more structured data fields of the received electronic request; train a probabilistic classification model using at least one structured data field of the identified set of previous electronic requests; execute the trained probabilistic classification model using the one or more unstructured data fields of the received electronic
(Continued)

request; and automatically select a request handler using an output of the executed probabilistic classification model.

19 Claims, 9 Drawing Sheets

(51) Int. Cl.
  *G06F 18/2415* (2023.01)
  *G06N 3/044* (2023.01)
  *G06N 7/01* (2023.01)

(56) References Cited

U.S. PATENT DOCUMENTS

| | | | |
|---|---|---|---|
| 10,650,432 B1* | 5/2020 | Joseph | G06N 3/08 |
| 10,958,779 B1* | 3/2021 | Rule | G06N 20/00 |
| 11,263,473 B2* | 3/2022 | Kim | G06F 16/51 |
| 11,416,867 B2* | 8/2022 | Lopes | G06Q 20/14 |
| 11,758,231 B2* | 9/2023 | Laverty | H04N 21/47202 |
| | | | 348/157 |
| 11,816,709 B2* | 11/2023 | Rosas-Maxemin | G06Q 50/30 |
| 2017/0180201 A1 | 6/2017 | Guven | |
| 2019/0065991 A1* | 2/2019 | Guggilla | G06N 20/00 |
| 2019/0288852 A1* | 9/2019 | Shetye | G06F 21/73 |
| 2021/0049421 A1* | 2/2021 | Tandecki | G06F 18/214 |
| 2021/0103610 A1* | 4/2021 | Lee | G06F 16/435 |
| 2021/0201393 A1* | 7/2021 | Tang | G01C 21/3605 |
| 2021/0350382 A1* | 11/2021 | Lopes | G06N 3/045 |
| 2021/0383453 A1* | 12/2021 | Gupta | G06F 40/274 |
| 2022/0182239 A1* | 6/2022 | Hassanzadeh | H04L 9/0866 |
| 2023/0104757 A1* | 4/2023 | Pramod | G06N 3/084 |
| | | | 706/11 |

OTHER PUBLICATIONS

Capgemini; Automate Trouble Ticketing Management with Natural Language Processing; https://www.capgemini.com/2016/12/automate-trouble-ticketing-management-with-natural-language-processing/; 2018; 8 pages.

Dorothea Wiesmann; IBM Research-Zurich; Machine Learning & Predictive Analytics For IT Services; Broad Application of Analytics and Data Science; IBM 2013; 17 pages.

ISRWO—Search Report/Written Opinion; PCT/CN2018/087818; dated Feb. 19, 2019; 9 Pages.

Sunview Software; Service Smart Technology; Leverage Big Data and Machine Learning To Deliver Intelligent Features for ITSM; Service Managment Built With Intelligence; https://www.sunviewsoftware.com/our-technology; Feb. 2, 2018; 9 pages.

Vesna Soraic; IT Service Management Made Smarter with Machine Learning; https://itsm.tools/service-management-made-smarter-machine-learning/; Feb. 1, 2018; 4 pages.

* cited by examiner

Machine Readable Medium
800

810
In response to a receipt of an electronic request comprising a structured data field and an unstructured data field, identify a set of previous electronic requests using the structured data fields of the received electronic request

820
Train a classification model using at least one structured data field of the identified set of previous electronic requests

830
Execute the trained classification model using the unstructured data field of the received electronic request

840
Select a request handler using an output of the executed classification model

FIG. 8

AUTOMATIC SELECTION OF REQUEST HANDLER USING TRAINED CLASSIFICATION MODEL

BACKGROUND

In computer science, machine learning refers to using techniques that allow a computer system to "learn" to perform a specific task without being explicitly programmed to do so. One type of machine learning is classification, which includes the selection of one of multiple categories that a particular item or sample is assigned to. For example, classification may be used to determine whether an input email message belongs in a "spam" category or a "not spam" category.

BRIEF DESCRIPTION OF THE DRAWINGS

Some implementations are described with respect to the following figures.

FIG. 8 is a diagram of an example machine-readable medium storing instructions in accordance with some implementations.

DETAILED DESCRIPTION

In accordance with some implementations, examples are provided for automated assignment of electronic requests. In some examples, a computer system may automatically assign an electronic request to one of multiple request handlers. However, in the event of an assignment to a wrong handler, re-assigning the electronic request may require time and effort. As such, the incorrect assignment of the electronic request can result in wasted resources and/or cost. Further, completion of the electronic request may be delayed, and may thus cause a deadline or service requirement to be missed.

As described further below with reference to FIGS. 1-9, some implementations may provide automated assignment of electronic requests. In some examples, a computing device may identify a set of previous electronic requests using structured data fields of a received electronic request. The computing device may train a probabilistic classification model using at least one structured data field of the identified set of previous electronic requests. The computing device may execute the trained probabilistic classification model using one or more unstructured data fields of the received electronic request, and select a request handler based on the output of the executed model. In some examples, the probabilistic classification model may select the request handler that has the best match in prior experience and skill set to complete the request. Accordingly, some implementations may avoid or reduce incorrect assignments of electronic requests, and may thus provide improved automated assignment of electronic requests to request handlers.

Figure 1:
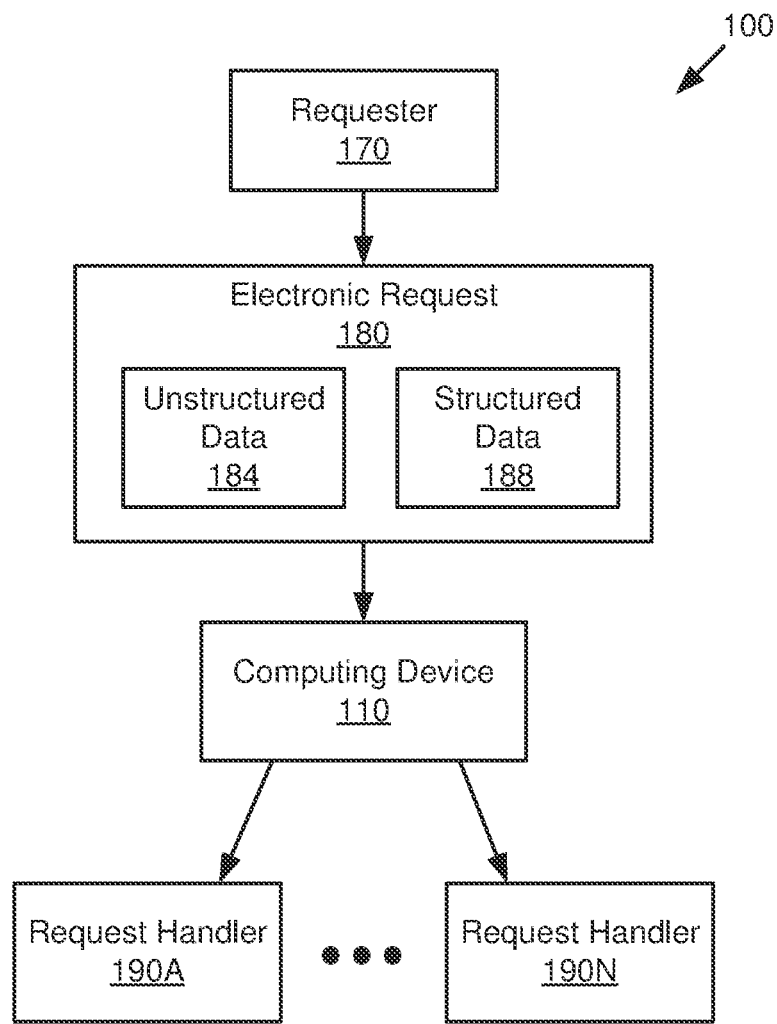
FIG. 1 is a schematic diagram of an example system, in accordance with some implementations.

Referring now to FIG. 1, shown a schematic diagram of an example system 100, in accordance with some implementations. As shown, in some implementations, the system 100 may include a computing device 110 receiving an electronic request 180 from a requester 170. As shown, in some implementations, the electronic request 180 may include unstructured data fields 184 and structured data fields 188. As used herein, "structured data fields" refers to data fields that only store values with a limited set of defined meanings. For example, the structured data fields 188 may include a date/time field, a location field, an active/inactive flag, a cost field, a priority value field, and so forth. In some examples, the structured data fields 188 may include metadata associated with a request. Further, as used herein, "unstructured data fields" refers to data fields that can store values without defined meanings. For example, the unstructured data fields 184 may include an unrestricted text field such as a comment field, a title field, and so forth.

In one or more implementations, the computing device 110 may assign the electronic request 180 to one of multiple request handlers 190A-190N (also referred to generally as request handlers 190). In some implementations, the computing device 110 may assign the electronic request 180 based on the unstructured data fields 184 and/or the structured data fields 188. The assignment of the electronic request 180 is described further below with reference to FIGS. 2-9. In some examples, the computing device 110 may be associated with an information technology (IT) organization, and the requester 170 may be an IT consumer (e.g., a client device, organization, person, etc.). In such examples, the electronic request 180 may represent be a service task or ticket to provide a service for help from customers. Further, in such examples, the request handlers 190 may be different IT support persons or groups that could be assigned to perform services associated with the electronic request 180.

Figure 2:
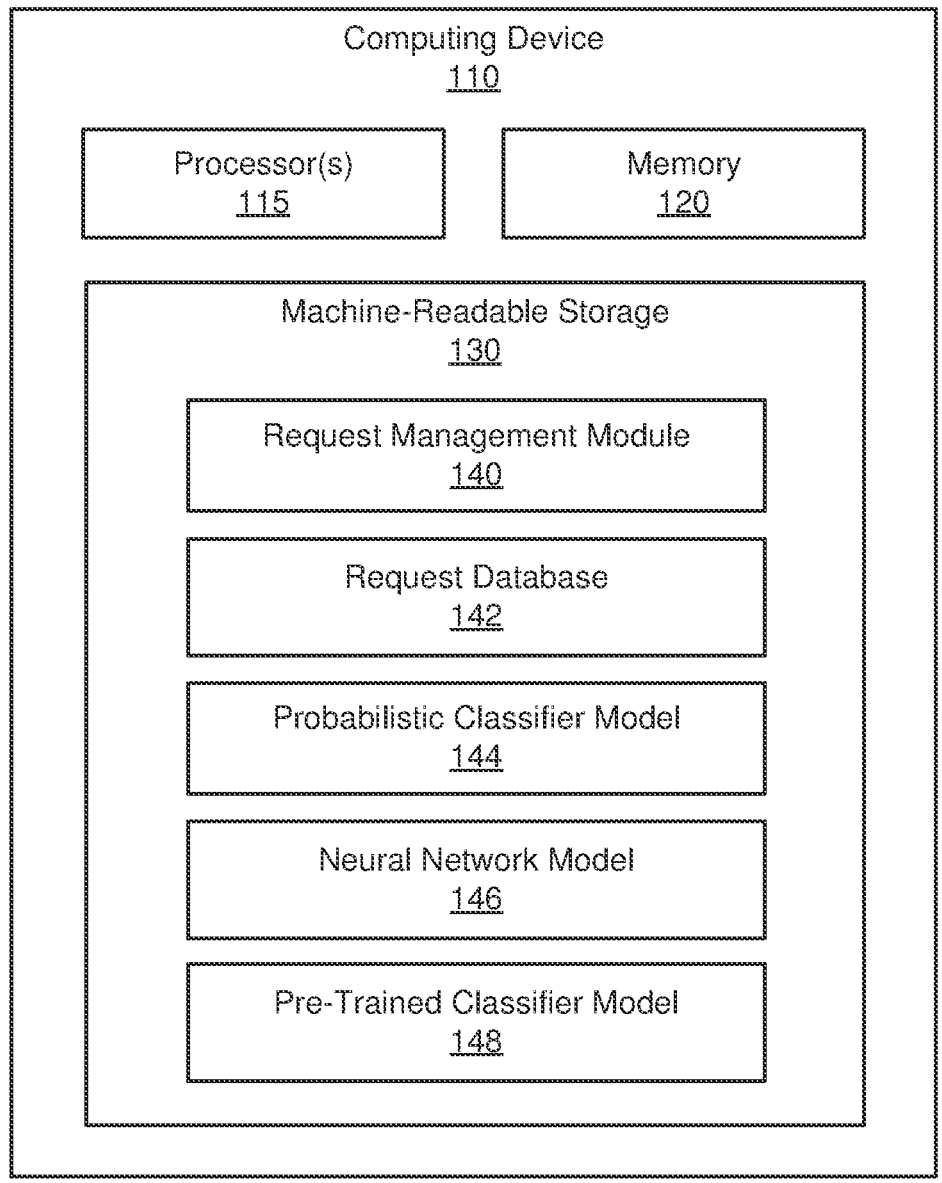
FIG. 2 is an illustration of an example computing device, in accordance with some implementations.

Referring now to FIG. 2, shown is an illustration of an example computing device 110 in accordance with some implementations. As shown, in some implementations, the computing device 110 may include processor(s) 115, memory 120, and machine-readable storage 130. The processor(s) 115 can include a microprocessor, a microcontroller, a processor module or subsystem, a programmable integrated circuit, a programmable gate array, multiple processors, a microprocessor including multiple processing cores, or another control or computing device. The memory 120 can be any type of computer memory (e.g., dynamic random access memory (DRAM), static random-access memory (SRAM), etc.). In some implementations, the machine-readable storage 130 can include non-transitory storage media such as such as an optical, semiconductor, magnetic storage device, and so forth.

In one or more implementations, the machine-readable storage 130 may include a request management module 140, a request database 142, a probabilistic classifier model 144, a neural network model 146, and a pre-trained classifier model 148. In some implementations, some or all of these elements included in the machine-readable storage 130 may be implemented as machine-readable instructions (e.g., software and/or firmware) that are executable by the processor(s) 115.

In one or more implementations, the request management module 140 may receive an electronic request, and may assign the received request to a specific handler. The request management module 140 may select the handler using the probabilistic classifier model 144, the neural network model 146, and/or the pre-trained classifier model 148. In some examples, the probabilistic classifier model 144 may be implemented using a naïve Bayes classifier. Further, in some examples, the neural network model 146 may be implemented using a recurrent neural network (RNN). In some examples, the pre-trained classifier model 148 may be implemented using a probabilistic classifier (e.g., a Bayesian model).

In some implementations, the request database 142 may store data regarding the electronic requests that have been received and/or assigned by the request management module 140. For example, the request database 142 may store, for each previously-received request, structured data, unstructured data, assigned handlers, request status, time consumed, request cost, request priority, request order, and so forth. In some implementations, the request database 142 may store data in one or more organized structures (e.g., relational tables, extensible markup language (XML) files, flat files, and so forth).

In one or more implementations, prior to receipt of the electronic request, the neural network model 146 and/or the pre-trained classifier model 148 may be trained using data in the request database 142. For example, the neural network model 146 and/or the pre-trained classifier model 148 may be trained using unstructured data fields stored in the request database 142 (e.g., the title field and/or description field of all historical requests). In some examples, the neural network model 146 and/or the pre-trained classifier model 148 may be trained periodically (e.g., daily, weekly, etc.), in response to a defined change in the request database 142 (e.g., for each request added or updated, for every ten requests, for a given percentage change, etc.).

In one or more implementations, the probabilistic classifier model 144 may not be trained prior to receipt of a request. For example, the probabilistic classifier model 144 may be newly trained in response to each request that is received. The use of the probabilistic classifier model 144 is described further below with reference to FIG. 4.

Figure 3:
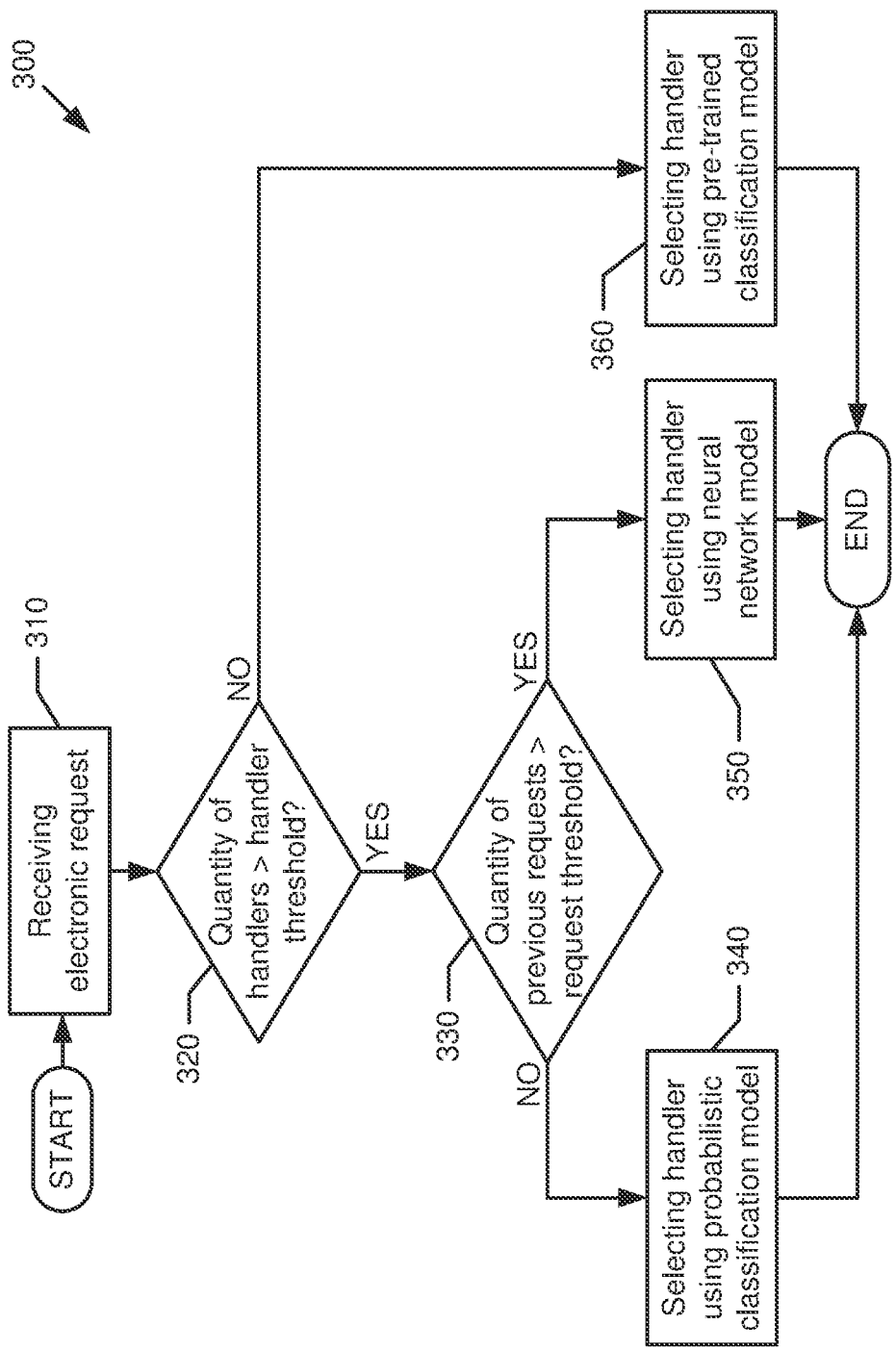
FIG. 3 is a flow diagram of an example process, in accordance with some implementations.

Referring now to FIG. 3, shown is an example process 300, in accordance with some implementations. In some examples, the process 300 may be performed by some or all of the computing device 110 shown in FIGS. 1-2. The process 300 may be implemented in hardware and/or machine-readable instructions (e.g., software and/or firmware). The machine-readable instructions are stored in a non-transitory computer readable medium, such as an optical, semiconductor, or magnetic storage device. For the sake of illustration, details of the process 300 may be described below with reference to FIGS. 1-2, which show examples in accordance with some implementations. However, other implementations are also possible.

Block 310 may include receiving an electronic request. For example, referring to FIG. 1, the computing device 110 receives the electronic request 180 from requester 170. In some implementations, the electronic request 180 may include unstructured data fields 184 and structured data fields 188. In some examples, the electronic request 180 may be a request for IT services (e.g., a help ticket).

Diamond 320 may include making a determination about whether the quantity of available handlers is greater than a defined handler threshold. For example, referring to FIGS. 1-2, the request management module 140 determines the total number of request handlers 190 that are available to handle the electronic request 180, and also determines whether this total number exceeds a threshold number of handlers. In some implementations, the handler threshold may be a configuration value stored or otherwise specified in the computing device 110.

If it is determined at diamond 320 that the quantity of available handlers is not greater than the handler threshold, then the process 300 continues at block 360, which includes selecting the handler using a pre-trained classification model. For example, referring to FIG. 2, the request management module 140 determines that the number of available handlers does not exceed a handler threshold, and in response selects a request handler 190 using the pre-trained classifier model 148. After block 360, the process 300 is completed.

However, if it is determined at diamond 320 that the quantity of available handlers is greater than the handler threshold, then the process 300 continues at diamond 330. Diamond 330 may include making a determination about whether the quantity of previous requests is greater than a defined request threshold. For example, referring to FIGS. 1-2, the request management module 140 determines whether the total number of requests represented in the request database 142 exceeds a threshold number of requests.

If it is determined at diamond 330 that the quantity of previous requests is greater than the request threshold, then the process 300 continues at block 350, which includes selecting the handler using a neural network model. For example, referring to FIG. 2, the request management module 140 determines that the total number of requests represented in the request database 142 exceeds a threshold number of requests, and in response selects a request handler 190 using the neural network model 146. After block 350, the process 300 is completed.

However, if it is determined at diamond 330 that the quantity of previous requests is not greater than the request threshold, then the process 300 continues at block 340, which includes selecting the handler using a probabilistic classification model. For example, referring to FIGS. 1-2, the request management module 140 determines whether the total number of requests represented in the request database 142 does not exceed a threshold number of requests, and in response selects a request handler 190 using the probabilistic classification model 144. After block 340, the process 300 is completed.

In some implementations, the process 300 may allow different types of classification models (i.e., probabilistic, neural network, and pre-trained) to be used in the automated assignment of requests to handlers. For example, the type of model used may be based on the quantity of available handlers and/or the quantity of previous requests. Accordingly, some implementations may provide automated assignment using models that are suited to characteristics of the organization or entity handling the request.

Figure 4:
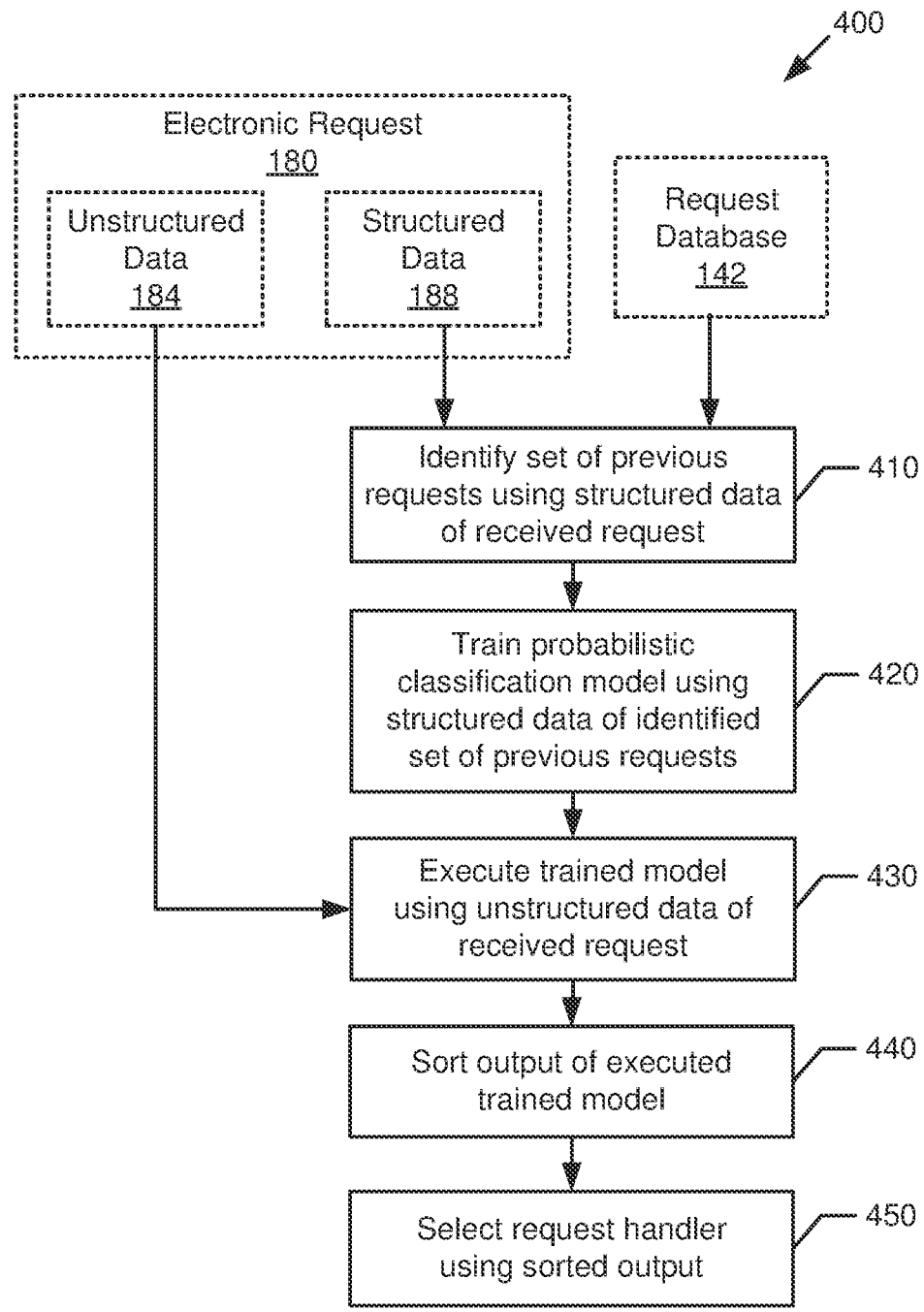
FIG. 4 is a diagram of example operations using a probabilistic classification model, in accordance with some implementations.

Referring now to FIG. 4, shown is a diagram 400 of example operations 410-450 using a probabilistic classification model, in accordance with some implementations. Assume that the operations 410-450 correspond generally to an exemplary expansion of the actions involved in box 340 (shown in FIG. 3). In some implementations, the operations 410-450 may be performed by the computing device 110 shown in FIGS. 1-2. However, other implementations are also possible.

Assume that the operations 410-450 are performed in response to the receipt of the electronic request 180. Operation 410 may identify a set of previous requests using the structured data of the received request 180. For example, operation 410 may involve identifying the subset of the previous requests in the request database 142 that match one or more fields of the structured data 188 in the received request 180 (e.g., device, location, urgency, organization, etc.). The identified set of previous requests may be referred to as being "similar" to the received request 180 in terms of structured data.

Operation 420 may train a probabilistic classification model using the structured data of the identified set of previous requests. For example, operation 420 may involve training the probabilistic classification model 144 (shown in FIG. 2) using the structured data fields of the set of previous requests (identified by operation 410). In some examples, the trained probabilistic classification model may be a naïve Bayes model.

Operation 430 may execute the trained probabilistic classification model using the unstructured data fields 184 of the received request 180. In some implementations, the output of executing the trained probabilistic classification model may include a set of candidate handlers that can be assigned to the received request 180.

Operation 440 may sort the output of the probabilistic classification model. For example, operation 440 may involve sorting the set of candidate handlers (provided by operation 430) according to one or more sorting rules. The sorting rules may be defined to identify the candidate handler that is best suited to handle the received request 180. For example, the sorting rules may sort according to the handler's status (e.g., idle, active, waiting, etc.), the handler's average resolution time of past requests, the number of pending requests in the handler's backlog, and so forth.

Operation 450 may select the request handler using the sorted output of the probabilistic classification model. For example, operation 450 may involve assigning the received request 180 to the candidate handler that is sorted first based on one or more sorting rules (e.g., the handler that is currently active and has the smallest number of pending requests).

In some examples, the probabilistic classification model may assign class labels to request instances. The class labels may be represented as vectors of feature values, where the class labels are drawn from a finite set. The probabilistic classification model may assume that the value of a particular feature is independent of the value of any other feature, given the class variable. The probabilistic classification model may be trained at runtime for each new request 180.

Figure 5:
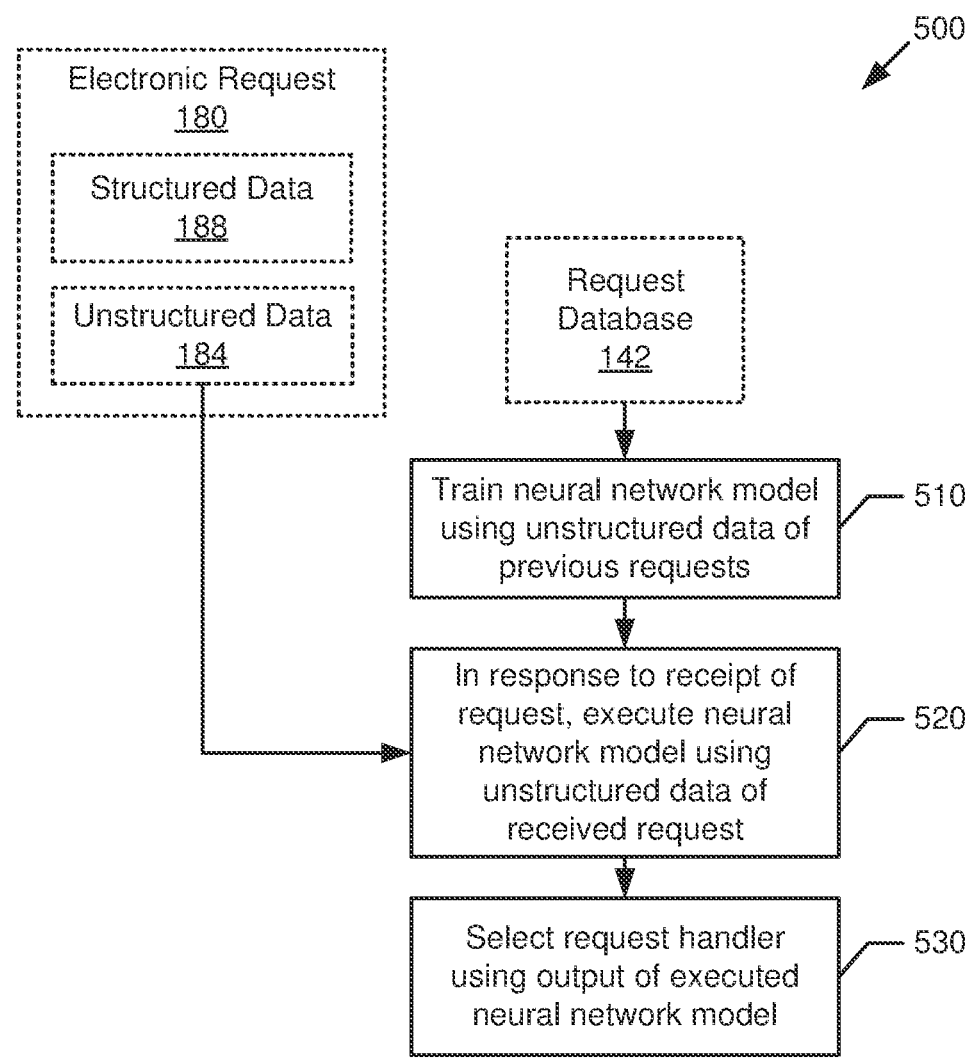
FIG. 5 is a diagram of example operations using a neural network model, in accordance with some implementations.

Referring now to FIG. 5, shown is a diagram 500 of example operations 510-530 using a neural network model, in accordance with some implementations. Assume that the operations 510-530 correspond generally to an exemplary expansion of the actions involved in box 350 (shown in FIG. 3). In some implementations, the operations 510-530 may be performed by the computing device 110 shown in FIGS. 1-2. However, other implementations are also possible.

Operation 510 may train a neural network model using the unstructured data of previous requests. For example, operation 510 may involve training a neural network model using the unstructured data fields of all (or a portion of) the previous requests in the request database 142. In some implementations, the neural network may be trained prior to the receipt of the electronic request 180. Further, in some examples, the neural network model may be a recurrent neural network (RNN).

Operation 520 may, in response to the receipt of the request 180, execute the trained neural network model using the unstructured data 184 of the received request 180. For example, operation 520 may involve executing a trained RNN using the unstructured data fields 184 of the received request 180.

Operation 530 may select the request handler using the output of the neural network model. For example, operation 530 may involve assigning the received request 180 to the candidate handler identified by the output of executing the trained RNN.

In some examples, the trained RNN may be referred to as a deep learning neural network for natural language processing. The RNN may be an artificial neural network in which connections between nodes form a directed graph along a sequence. Further, the nodes could be various types of neural networks. In some examples, the trained neural network model may be a bi-directional Gated Recurrent Unit (GRU) model which uses a finite sequence to predict or label each element of the sequence based on the element's past and future contexts. In some examples, the outputs of two RNNs may be concatenated, with one RNN processing the sequence from left to right, and the other RNN processing the sequence from right to left.

Figure 6:
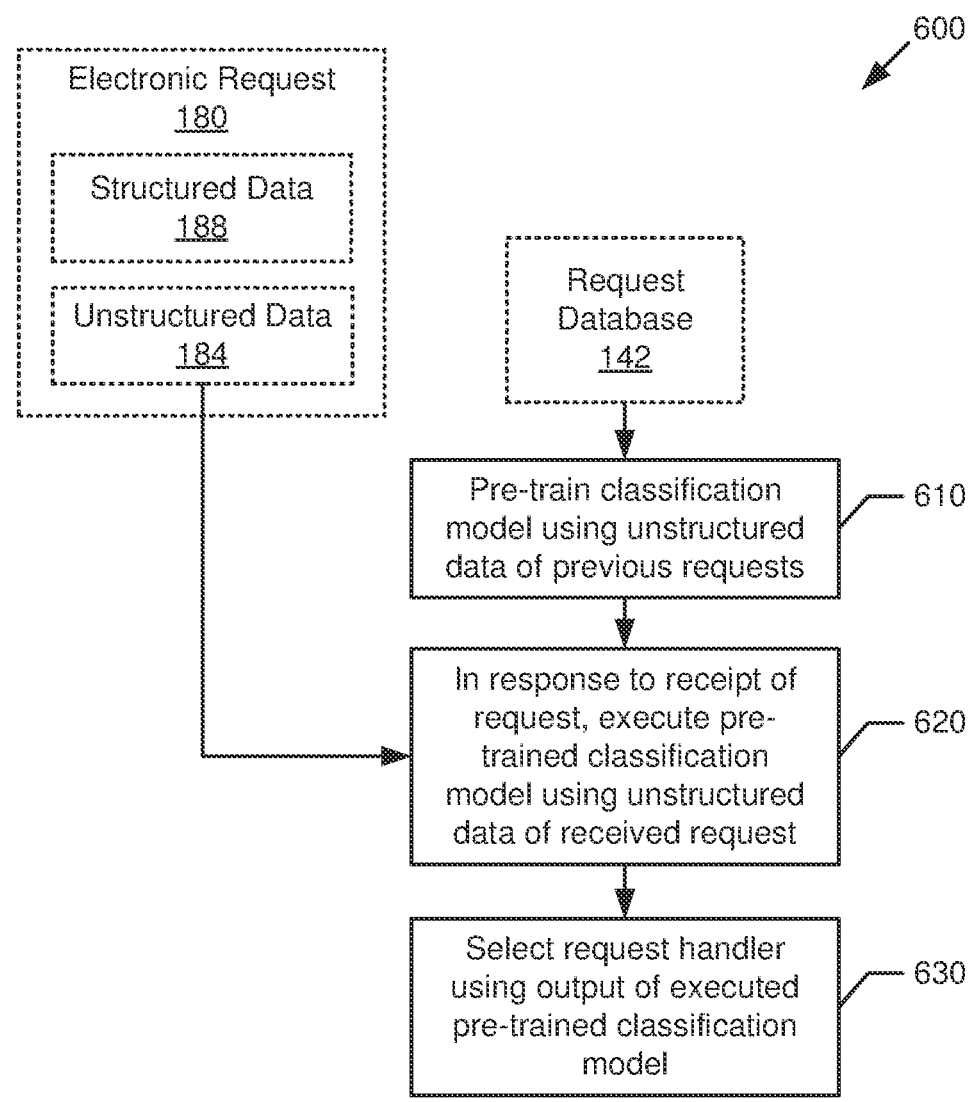
FIG. 6 is a diagram of example operations using a pre-trained classification model, in accordance with some implementations.

Referring now to FIG. 6, shown is a diagram 600 of example operations 610-630 using a pre-trained classification model, in accordance with some implementations. Assume that the operations 610-630 correspond generally to an exemplary expansion of the actions involved in box 360 (shown in FIG. 3). In some implementations, the operations 610-630 may be performed by the computing device 110 shown in FIGS. 1-2. However, other implementations are also possible.

Operation 610 may pre-train a classification model using the unstructured data of previous requests. In some implementations, a "pre-trained" model refers to a model that is trained prior to receipt of a current request to be classified by the model. For example, operation 610 may involve, prior to the receipt of the electronic request 180, training a classification model using the unstructured data fields of all (or a portion of) the previous requests in the request database 142.

Operation 620 may, in response to the receipt of the request 180, execute the pre-trained classification model using the unstructured data 184 of the received request 180. Operation 630 may select the request handler using the output of the executed model. For example, operation 630 may involve assigning the received request 180 to the candidate handler identified by the output of executing the pre-trained classification model. In some examples, the pre-trained classification model may use a Bayesian Inference algorithm, an Information Theory algorithm, and so forth. Further, in some examples, the pre-trained classification model may group historical requests by handler (also referred to as the "assignee").

Figure 7:
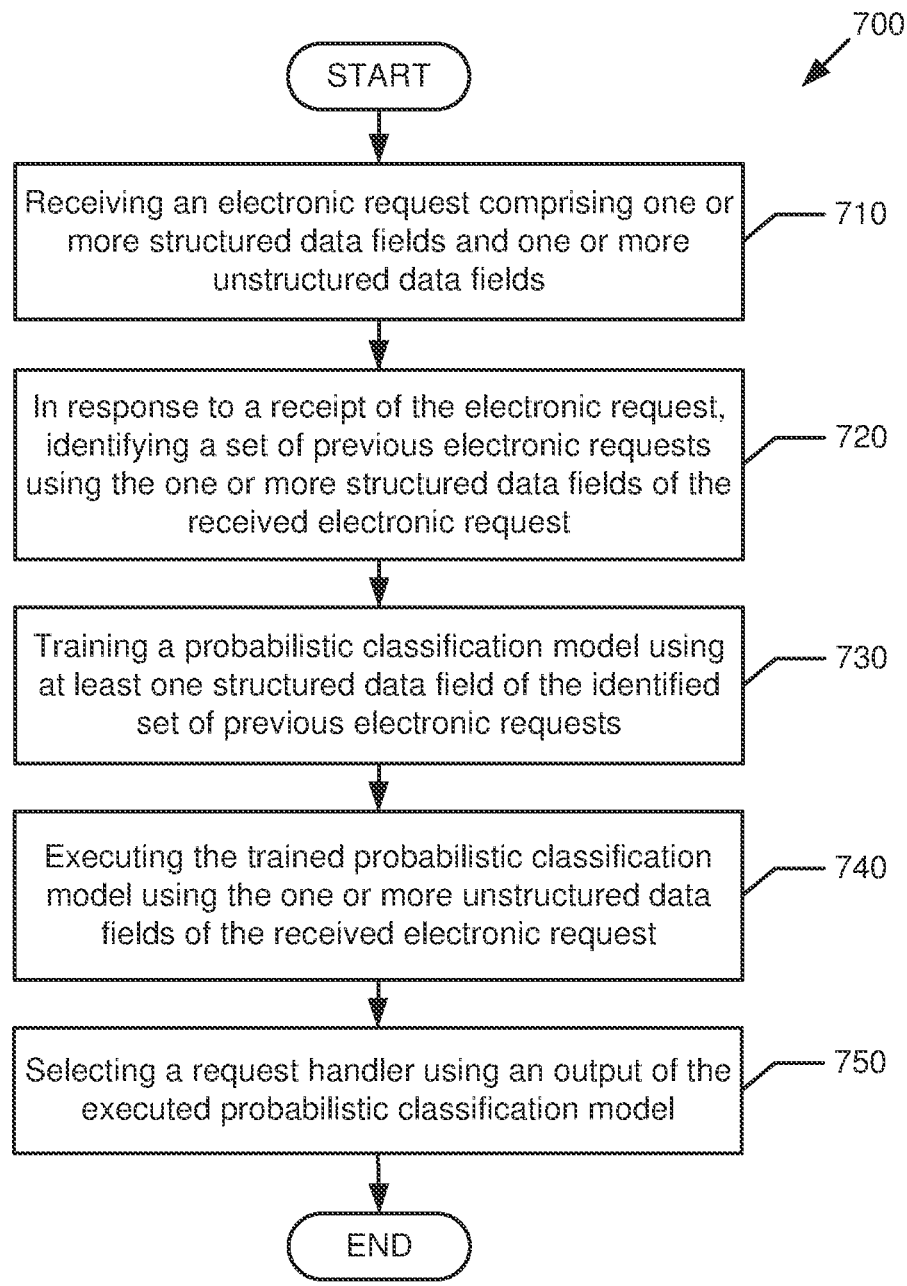
FIG. 7 is a flow diagram of an example process, in accordance with some implementations.

Referring now to FIG. 7, shown is an example process 700, in accordance with some implementations. In some examples, the process 700 may be performed by some or all of the computing device 110 shown in FIGS. 1-2. The process 700 may be implemented in hardware and/or machine-readable instructions (e.g., software and/or firmware). The machine-readable instructions are stored in a non-transitory computer readable medium, such as an optical, semiconductor, or magnetic storage device. For the sake of illustration, details of the process 700 may be described below with reference to FIGS. 1-6, which show examples in accordance with some implementations. However, other implementations are also possible.

Block 710 may include receiving an electronic request comprising one or more structured data fields and one or more unstructured data fields. For example, referring to FIG. 1, the computing device 110 receives the electronic request 180 including unstructured data fields 184 and structured data fields 188.

Block 720 may include, in response to a receipt of the electronic request, identifying a set of previous electronic requests using the one or more structured data fields of the received electronic request. For example, referring to FIGS. 1-4, the computing device 110 may identify a set of the previous requests in the request database 142 that match one or more fields of the structured data 188 in the received request 180.

Block 730 may include training a probabilistic classification model using at least one structured data field of the identified set of previous electronic requests. For example, referring to FIGS. 1-4, the probabilistic classification model 144 may be trained using the structured data fields of the set of previous requests (identified at block 720).

Block 740 may include executing the trained probabilistic classification model using the one or more unstructured data fields of the received electronic request. For example, referring to FIGS. 1-4, the trained probabilistic classification model 144 may be executed using the unstructured data fields 184 of the received request 180.

Block 750 may include selecting a request handler using an output of the executed probabilistic classification model. For example, referring to FIGS. 1-4, the output of the probabilistic classification model may be sorted according to one or more sorting rules. The received request 180 may be assigned to the handler that is sorted first based on the sorting rules. After block 750, the process 700 is completed.

Referring now to FIG. 8, shown is machine-readable medium 800 storing instructions 810-840, in accordance with some implementations. The instructions 810-840 can be executed by any number of processors (e.g., the processor(s) 115 shown in FIG. 2). The machine-readable medium 500 may be a non-transitory storage medium, such as an optical, semiconductor, or magnetic storage medium.

Instruction 810 may be executed to, in response to a receipt of an electronic request comprising a structured data field and an unstructured data field, identify a set of previous electronic requests using the structured data fields of the received electronic request.

Instruction 820 may be executed to train a classification model using at least one structured data field of the identified set of previous electronic requests.

Instruction 830 may be executed to execute the trained classification model using the unstructured data field of the received electronic request.

Instruction 840 may be executed to select a request handler using an output of the executed classification model.

Figure 9:
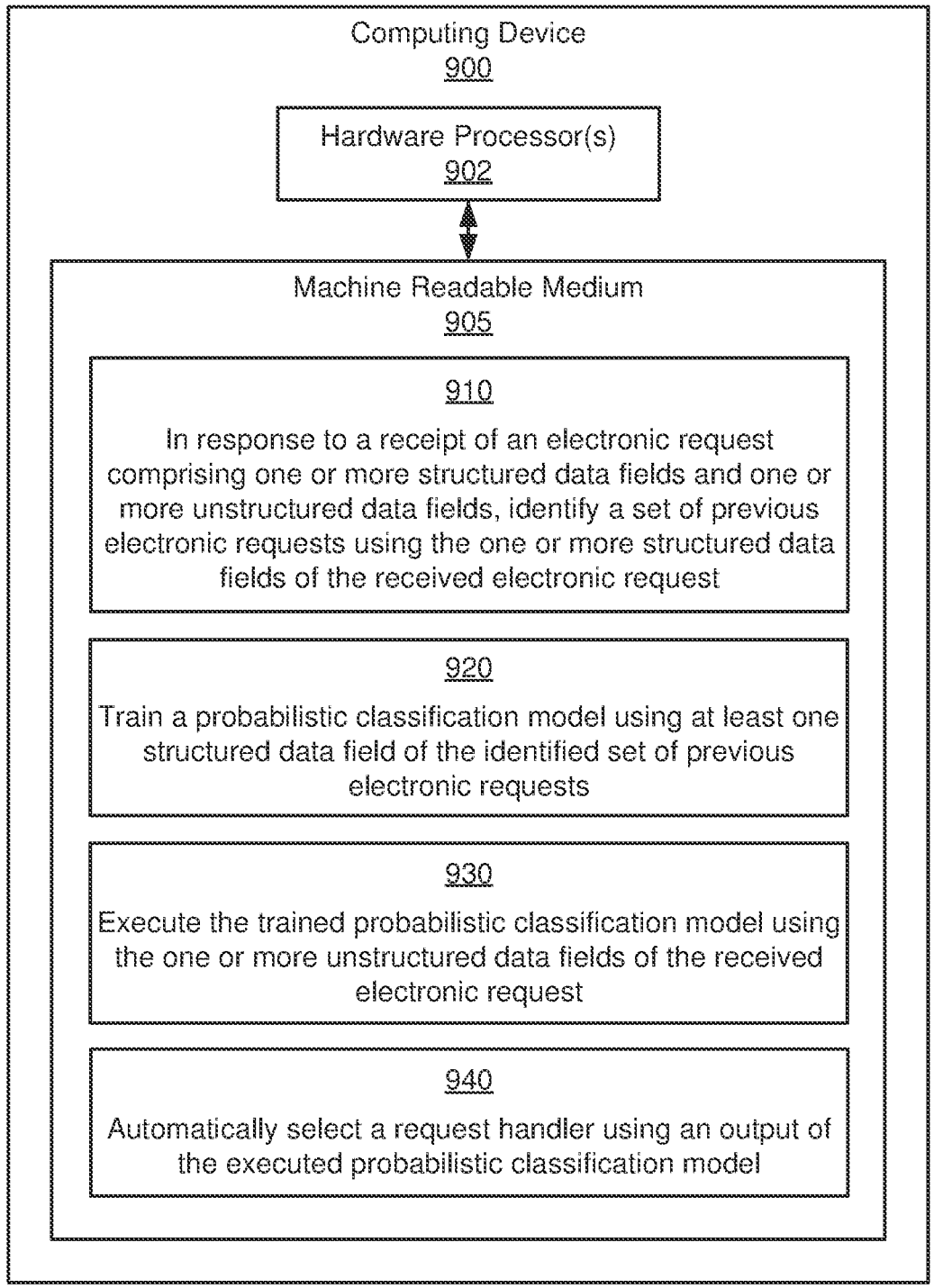
FIG. 9 is a schematic diagram of an example computing device, in accordance with some implementations.

Referring now to FIG. 9, shown is a schematic diagram of an example computing device 900. In some examples, the computing device 900 may correspond generally to the computing device 110 shown in FIGS. 1-2. As shown, the computing device 900 may include hardware processor(s) 902 and machine-readable storage medium 905. The machine-readable storage medium 905 may be a non-transitory medium, and may store instructions 910-940. The instructions 910-940 can be executed by the hardware processor(s) 902.

Instruction 910 may be executed to, in response to a receipt of an electronic request comprising one or more structured data fields and one or more unstructured data fields, identify a set of previous electronic requests using the one or more structured data fields of the received electronic request.

Instruction 920 may be executed to train a probabilistic classification model using at least one structured data field of the identified set of previous electronic requests.

Instruction 930 may be executed to execute the trained probabilistic classification model using the one or more unstructured data fields of the received electronic request.

Instruction 940 may be executed to automatically select a request handler using an output of the executed probabilistic classification model.

In accordance with some implementations, examples are provided for automated assignment of electronic requests. In some implementations, a computing device may identify a set of previous electronic requests using structured data fields of a received electronic request. The computing device may train a classification model using a structured data field of the identified set of previous electronic requests. The computing device may execute the trained classification model using unstructured data fields of the received electronic request, and select a request handler based on the output of the executed model. Accordingly, some implementations may avoid or reduce incorrect assignments of electronic requests, and may thus provide automated assignment of electronic requests to request handlers.

Further, some implementations may include using a pre-trained classification model and/or a neural network model based on the quantity of available handlers and/or the quantity of previous requests. Accordingly, some implementations may provide automated assignment using models that are best suited to characteristics of the organization or entity handling the request.

Note that, while FIGS. 1-9 show various examples, other implementations are contemplated. For example, referring to FIG. 1, it is contemplated that the system 100 may include any number of devices or systems. Further, it is contemplated that each computing device 110 include additional components than those shown in FIG. 2. Other combinations and/or variations are also possible.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A computing device comprising:
a hardware processor; and
a machine-readable storage medium storing instructions, the instructions executable by the hardware processor to:
in response to a receipt of an electronic request comprising one or more structured data fields and one or more unstructured data fields, search a database to identify a set of previous electronic requests using the one or more structured data fields of the received electronic request, wherein each of the identified set of previous electronic requests satisfies a threshold of similarity with respect to the one or more structured data fields of the received electronic request;
train a probabilistic classification model using at least one structured data field of the identified set of previous electronic requests;
execute the trained probabilistic classification model using the one or more unstructured data fields of the received electronic request; and
automatically select a request handler using an output of the trained probabilistic classification model.

2. The computing device of claim 1, wherein the one or more unstructured data fields comprises an unrestricted text field.

3. The computing device of claim 1, wherein the output of the trained probabilistic classification model comprises a plurality of request handlers, and wherein the instructions cause the hardware processor to:
sort the plurality of request handlers into a sorted order; and
select the request handler based on the sorted order of the plurality of request handlers.

4. The computing device of claim 3, wherein the plurality of request handlers are sorted based on at least one of handler status, average resolution time, and a number of pending request.

5. The computing device of claim 1, wherein the instructions further cause the hardware processor to re-train the trained probabilistic classification model in response to:
a determination that an available quantity of request handlers exceeds a handler threshold, and
a determination that an available quantity of previous electronic requests does not exceed a request threshold.

6. The computing device of claim 1, wherein the electronic request comprises an Information Technology (IT) service request, and wherein the request handler is an IT agent.

7. A non-transitory machine-readable storage medium storing instructions that upon execution cause a processor to:
in response to a receipt of an electronic request comprising a structured data field and an unstructured data field, search a database of previous electronic requests to identify a set of previous electronic requests using the structured data field of the received electronic request, wherein each of the identified set of previous electronic requests satisfies a threshold of similarity with respect to the structured data field of the received electronic request;
train a classification model using at least one structured data field of the identified set of previous electronic requests;
execute the trained classification model using the unstructured data field of the received electronic request; and
select a request handler using an output of the trained classification model.

8. The non-transitory machine-readable storage medium of claim 7, wherein the classification model is a Naïve Bayes model.

9. The non-transitory machine-readable storage medium of claim 7, wherein the classification model is a probabilistic classification model, and wherein the instructions further cause the processor to:
train the probabilistic classification model in response to:
a determination that an available quantity of request handlers exceeds a handler threshold, and
a determination that an available quantity of previous electronic requests does not exceed a request threshold.

10. The non-transitory machine-readable storage medium of claim 9, wherein the instructions further cause the processor to:
in response to a determination that the available quantity of request handlers does not exceed the handler threshold:
execute a pre-trained classification model using the unstructured data field of the received electronic request; and
select the request handler using an output of the pre-trained classification model.

11. The non-transitory machine-readable storage medium of claim 7, wherein the unstructured data field of the received electronic request comprises a title field or a description field.

12. The non-transitory machine-readable storage medium of claim 7, wherein the structured data field of the received electronic request comprises a location field or an impact field.

13. The non-transitory machine-readable storage medium of claim 7, wherein the output of the trained classification model comprises a plurality of request handlers, and wherein the instructions cause the processor to:
sort the plurality of request handlers into a sorted order; and
select the request handler based on the sorted order of the plurality of request handlers.

14. A computer implemented method, comprising:
receiving an electronic request comprising one or more structured data fields and one or more unstructured data fields;
in response to a receipt of the electronic request, searching a database of previous electronic requests to identify a set of previous electronic requests using the one or more structured data fields of the received electronic request, wherein each of the identified set of previous electronic requests satisfies a threshold of similarity with respect to the one or more structured data fields of the received electronic request;
training a probabilistic classification model using at least one structured data field of the identified set of previous electronic requests;

executing the trained probabilistic classification model using the one or more unstructured data fields of the received electronic request; and selecting a request handler using an output of the trained probabilistic classification model.

15. The computer implemented method of claim 14, further comprising:

determining whether an available quantity of request handlers exceeds a handler threshold;

determining whether an available quantity of previous electronic requests exceeds a request threshold; and training the probabilistic classification model in response to a determination that:

the available quantity of request handlers exceeds the handler threshold, and the available quantity of previous electronic requests does not exceed the request threshold.

16. The computer implemented method of claim 15, further comprising:

in response to a determination that the available quantity of request handlers does not exceed the handler threshold:

executing a pre-trained classification model using the one or more unstructured data fields of the received electronic request; and selecting the request handler using an output of the pre-trained classification model.

17. The computer implemented method of claim 15, further comprising:

in response to a determination that the available quantity of previous electronic requests exceeds the request threshold:

executing a recurrent neural network using the one or more unstructured data fields of the received electronic request; and selecting the request handler using an output of the recurrent neural network.

18. The computer implemented method of claim 14, wherein the output of the trained probabilistic classification model comprises a plurality of request handlers, the method further comprising:

sorting the plurality of request handlers into a sorted order; and selecting the request handler based on the sorted order of the plurality of request handlers.

19. The computer implemented method of claim 18, wherein the sorted order is based on a quantity of pending requests assigned to each of the plurality of request handlers.

\* \* \* \* \*